United States Patent
Kim

(10) Patent No.: US 8,313,435 B2
(45) Date of Patent: Nov. 20, 2012

(54) CLUTTER SIGNAL FILTERING IN AN ULTRASOUND SYSTEM

(75) Inventor: Tae Yun Kim, Seoul (KR)

(73) Assignee: Medison Co., Ltd., Kangwon-do (KR)

( * ) Notice: Subject to any disclaimer, the term of this patent is extended or adjusted under 35 U.S.C. 154(b) by 555 days.

(21) Appl. No.: 12/404,248

(22) Filed: Mar. 13, 2009

(65) Prior Publication Data

US 2009/0240153 A1    Sep. 24, 2009

(30) Foreign Application Priority Data

Mar. 20, 2008 (KR) .................. 10-2008-0025970

(51) Int. Cl.
*A61B 8/00* (2006.01)

(52) U.S. Cl. ......... 600/441; 600/438; 600/454; 600/459

(58) Field of Classification Search .................. 600/407, 600/437, 441, 442, 443, 453, 455, 457; 382/128, 382/131
See application file for complete search history.

(56) References Cited

U.S. PATENT DOCUMENTS

| | | | |
|---|---|---|---|
| 5,487,369 A | | 1/1996 | Hara et al. |
| 6,146,331 A | | 11/2000 | Wong |
| 6,210,332 B1 | * | 4/2001 | Chiao et al. .................. 600/443 |
| RE38,209 E | * | 8/2003 | Yamazaki et al. ............ 600/455 |
| 2001/0009977 A1 | * | 7/2001 | Sato et al. ..................... 600/441 |
| 2002/0091319 A1 | * | 7/2002 | Moehring et al. ............ 600/454 |
| 2002/0169378 A1 | | 11/2002 | Mo et al. |
| 2004/0199078 A1 | * | 10/2004 | Mo et al. ........................ 600/437 |
| 2005/0101863 A1 | * | 5/2005 | Kawagishi et al. ........... 600/443 |
| 2005/0148875 A1 | * | 7/2005 | Sato .............................. 600/453 |
| 2005/0251034 A1 | * | 11/2005 | Dubberstein ................. 600/437 |

FOREIGN PATENT DOCUMENTS

EP        0521498 A1    7/1992

OTHER PUBLICATIONS

Extended European Search Report for EP 09003732.6, mailed Jul. 13, 2009, 8 pages.
Yoo et al., "Adaptive clutter filtering for ultrasound color flow imaging," Ultrasound in Med. & Biol., vol. 29, No. 9, 2003, pp. 1311-1320.

* cited by examiner

*Primary Examiner* — James Kish
*Assistant Examiner* — Michael N Fisher
(74) *Attorney, Agent, or Firm* — McDermott Will & Emery LLP

(57) ABSTRACT

Examples for filtering clutter signals from receive signals obtained in a Doppler mode in an ultrasound system are disclosed. The signal processing unit processes received echoes to provide 2-dimensional image data of the target object, the 2-dimensional image data being representative of a 2-dimensional image. A region of interest (ROI) is set on the 2-dimensional image of the target object, The signal processing unit obtains a Doppler mode image pixel data corresponding to the ROI. The signal processing unit sets filter cutoff frequencies based on characteristics of the Doppler mode image pixel data and filter the Doppler mode image pixel data with the set filter cutoff frequencies to output filtered pixel data with clutter signals filtered.

15 Claims, 4 Drawing Sheets

CLUTTER SIGNAL FILTERING IN AN ULTRASOUND SYSTEM

The present application claims priority from Korean Patent Application No. 10-2008-0025970 filed on Mar. 20, 2008, the entire subject matter of which is incorporated herein by reference.

TECHNICAL FIELD

The present disclosure relates to signal processing, and more particularly to clutter signal filtering in an ultrasound system.

BACKGROUND

Recently, an ultrasound system has been extensively used in the medical field due to its non-invasive and non-destructive nature. Modern high-performance ultrasound imaging diagnostic systems and techniques are commonly used to produce two- or three-dimensional ultrasound images of internal features of patients. In order to provide the ultrasound images, the ultrasound system operates in various image modes such as a brightness mode, a Doppler mode and the like to acquire ultrasound images for diagnosis.

In the Doppler mode, the ultrasound system provides a color flow image showing velocities of moving objects such as blood flow, a heart, etc. The color flow image may be formed based on Doppler signals obtained by alternately transmitting and receiving ultrasound signals to and from a target object. The Doppler signals may contain low frequency signals due to the motion of cardiac walls or valves of a heart. The low frequency signals (so-called clutter signals) have amplitude of over 100 times than that of normal Doppler signals obtained from the blood flow. The clutter signals may be an obstacle to accurately detect velocities of the blood flow. Thus, it is required to remove the clutter signals from the Doppler signals for accurate detection. The ultrasound system adopts clutter filters, which are types of a high pass filter, to remove the clutter signals.

The clutter filters of a conventional ultrasound system remove the clutter signals with a specific cutoff frequency. In such a case, if the cutoff frequency is highly set, then the Doppler signals of a relatively low frequency may be also cut off with the clutter signals. Thus, it may be difficult to accurately detect the velocities of the blood flow.

SUMMARY

Embodiments for setting cutoff frequencies of clutter filters based on power and mean frequency of clutter signals are disclosed herein. In one embodiment, by way of non-limiting example, an ultrasound system comprises: a Tx/Rx unit configured to transmit ultrasound signals to a target object and receive echoes reflected from the target object; a signal processing unit configured to process the received echoes to provide 2-dimensional image data of the target object, the 2-dimensional image data being representative of a 2-dimensional image; and an input unit configured to enable a user to set a region of interest (ROI) on the 2-dimensional image of the target object, wherein the Tx/Rx unit and the signal processing unit are further configured to operate such that Doppler mode image pixel data corresponding to the ROI is obtained, and wherein the signal processing unit is further configured to set filter cutoff frequencies based on characteristics of the Doppler mode image pixel data and filter the Doppler mode image pixel data with the set filter cutoff frequencies to output filtered pixel data with clutter signals filtered.

In another embodiment, a method of setting filters in an ultrasound system, the ultrasound system including a Tx/Rx unit, a storage unit and a signal processing unit, comprises: a) using the Tx % Rx unit within the ultrasound system to transmit ultrasound signals to a target object and receive echoes reflected from the target object; b) using the signal processing unit within the ultrasound system to process the received echoes to provide 2-dimensional image data of the target object, the 2-dimensional image data being representative of a 2-dimensional image; c) using an input unit within the ultrasound system to enable a user to set a region of interest (ROI) on the 2-dimensional image of the target object; d) using the Tx/Rx unit and the signal processing unit within the ultrasound system to operate such that Doppler mode image pixel data corresponding to the ROI is obtained; and e) using the signal processing unit within the ultrasound system to set filter cutoff frequencies based on characteristics of the Doppler mode image pixel data and filter the Doppler mode image pixel data with the set filter cutoff frequencies to output filtered pixel data with clutter signals filtered.

The Summary is provided to introduce a selection of concepts in a simplified form that are further described below in the Detailed Description. This Summary is not intended to identify key or essential features of the claimed subject matter, nor is it intended to be used in determining the scope of the claimed subject matter.

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 1:
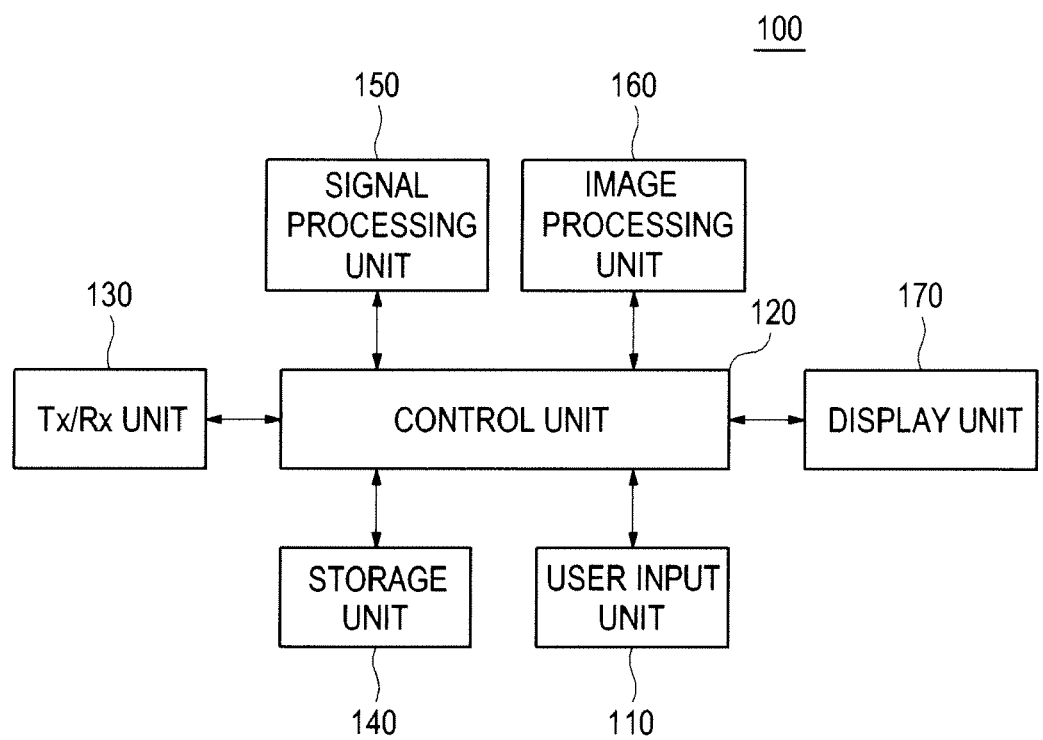
FIG. 1 is a block diagram showing an illustrative embodiment of an ultrasound system.

Referring to FIG. 1, an illustrative embodiment of an ultrasound system 100 is shown. As depicted, the ultrasound system 100 may include a user input unit 110 allowing a user to input setup information of a region of interest (ROI). The ROI may include a color box and the setup information of the ROI may include information upon position and size of the ROI.

Figure 2:
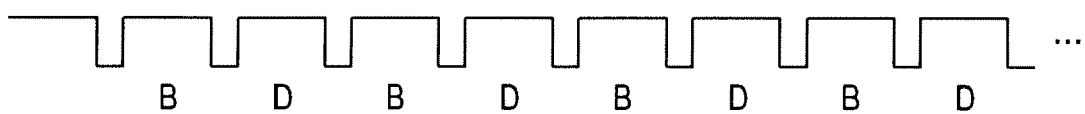
FIG. 2 is a timing diagram showing an example of Tx/Rx of ultrasound signals.

The ultrasound system 100 may further include a control unit 120. The control unit 120 may be configured to control transmission/reception (Tx/Rx) of ultrasound signals based on the setup information of the ROI. The control unit 120 may control Tx/Rx of the ultrasound signals such that Tx/Rx of first ultrasound signals "B" for a B-mode image and second ultrasound signals "D" for a Doppler mode image may be alternately performed, as illustrated in FIG. 2. The Doppler mode image may be a color flow image for the ROI set on the B-mode image. Also, the control unit 120 may control the entire operations of the ultrasound system 100.

As shown in FIG. 1, the ultrasound system 100 may further include a Tx/Rx unit 130. The Tx/Rx unit 130 may transmit/receive the first ultrasound signals to/from the target object in a B mode, thereby outputting first receive signals. The Tx/Rx unit 130 may also transmit/receive the second ultrasound signals to/from the target object in the Doppler mode, thereby outputting second receive signals. The Tx/Rx of the first and second ultrasound signals may be alternately carried out at a repletion frequency. The second receive signal may include Doppler signals and clutter signals. The Doppler signals may be obtained based on echo signals reflected from the blood flow. The Doppler signals have characteristics of a relatively high frequency and a weak intensity. The clutter signals may be obtained based on echo signals reflected from a cardiac wall or a valve of a heart. The clutter signals have characteristics of a relatively low frequency and a high intensity. In one embodiment, the Tx/Rx unit 130 may include a probe (not shown) for generating the ultrasound signal and the receive signal. The Tx/Rx unit 130 may further include a beam former (not shown) for transmit focusing and receive focusing.

The ultrasound system 100 may further include a storage unit 140. In one embodiment, the ultrasound system 100 may store the second receive signals outputted from the Tx/Rx unit 130. The second receive signals may represent Doppler mode image pixel data corresponding to the ROI. Also, the storage unit 140 may store information upon a plurality of cutoff frequencies for removing the clutter signals. In one embodiment, the storage unit 140 may include a first section (not shown) for storing the second receive signals and a second section (not shown) for storing the information upon the plurality of cutoff frequencies.

In one embodiment, the ultrasound system 100 may further include a signal processing unit 150. The signal processing unit 150 may be configured to process the first receive signals to provide 2-dimensional image data representing a 2-dimensional ultrasound image of the target object and set a plurality of filters with the cutoff frequencies to remove the clutter signals from pixel signals within a region of interest (ROI) set on the 2-dimensional ultrasound image based on the setup information. The signal processing unit 150 may be further configured to perform signal processing upon the first receive signal for image optimization (e.g., gain adjustment, etc.).

Figure 3:
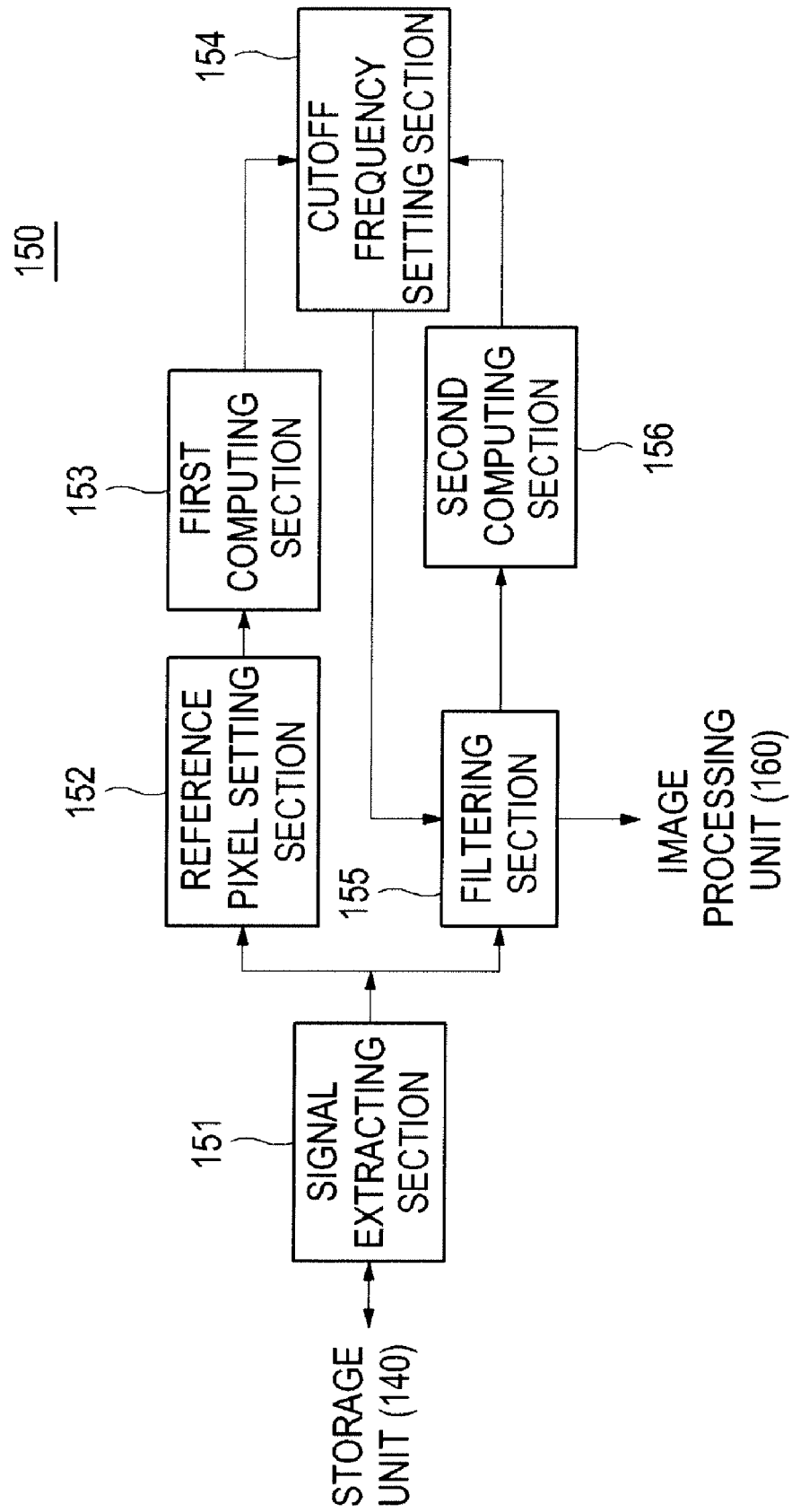
FIG. 3 is a block diagram showing an illustrative embodiment of a signal processing unit.
Figure 4:
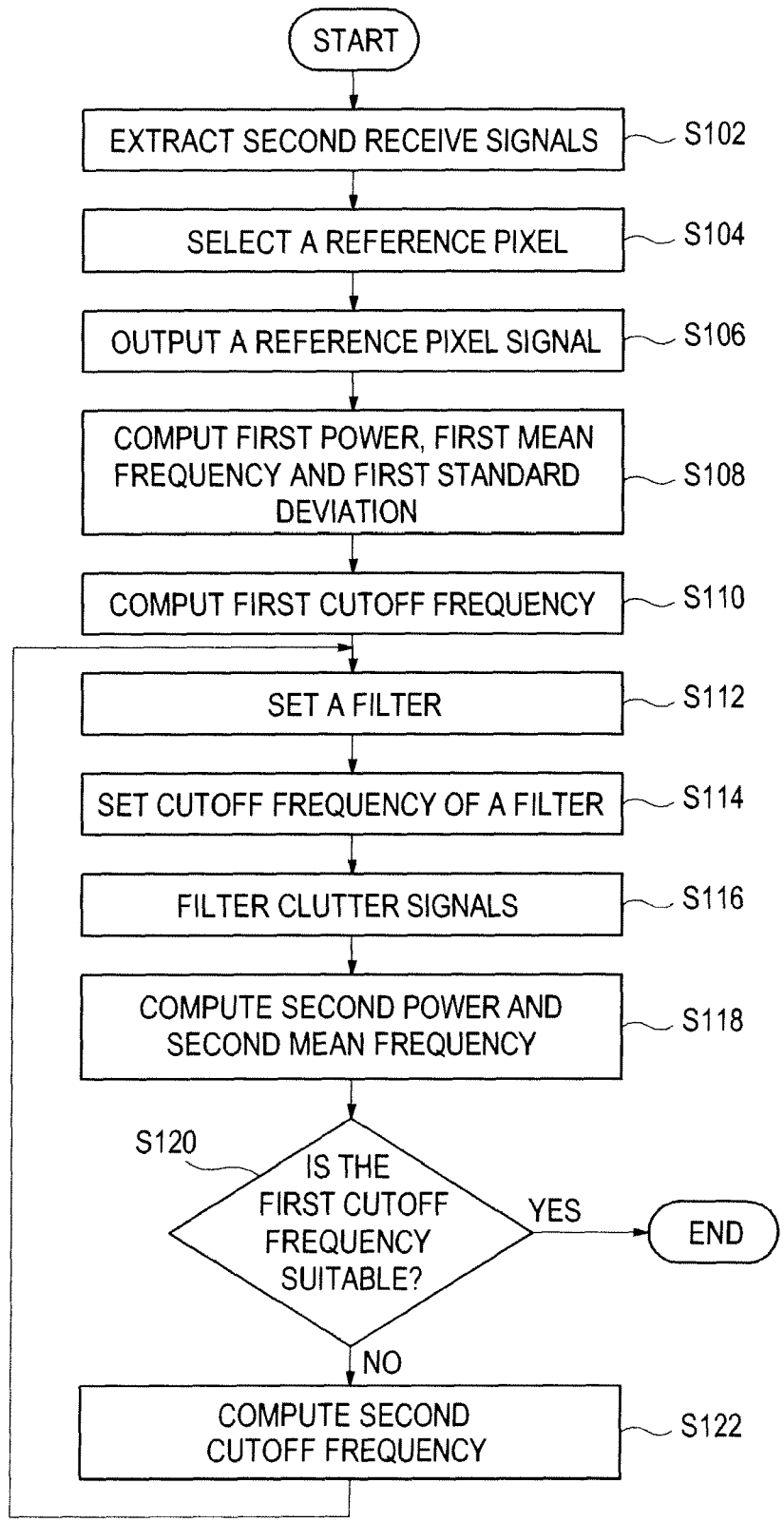
FIG. 4 is a flowchart showing an example of setting the cutoff frequencies.
Figures 5, 6:
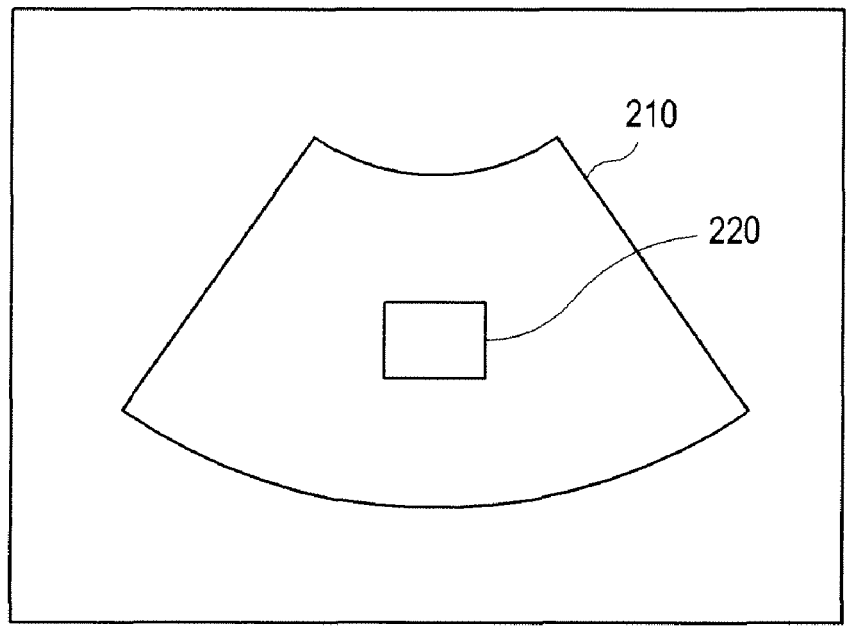
FIG. 5 is a schematic diagram showing an example of a region of interest set on a 2-dimensional ultrasound image.
FIG. 6 is a schematic diagram showing an example of pixels within the region of interest.

FIG. 3 is a block diagram of an illustrative embodiment of the signal processing unit 150. FIG. 4 is a flowchart showing an example of setting the cutoff frequencies. FIG. 5 is a schematic diagram showing an example of ROI set on the 2-dimensional ultrasound image. FIG. 6 is a schematic diagram showing an example of pixels within the region of interest.

The signal processing unit 150 may include a signal extracting section 151. In one embodiment, the signal extracting section 151 may be configured to extract the second receive signals (i.e., Doppler mode image pixel data) from the storage unit 140 at step S102. The signal processing unit 151 may further include a reference pixel setting section 152. In one embodiment, the reference pixel setting section 152 may select a reference pixel from pixels contained within the ROI and output a signal corresponding to the reference pixel ("reference pixel signal") from the Doppler mode image pixel data) at step S106. In another embodiment, the reference pixel setting section 152 may divide the pixels within the ROI into a plurality of groups. Each of the groups may include a predetermined number of neighboring pixels. The reference pixel setting section 152 may select a reference pixel from each of the groups. For example, assuming that pixels $P_{0,0}$-$P_{5,5}$ exist within the ROI, the reference pixel setting section 152 may divide the pixels $P_{0,0}$-$P_{5,5}$ into four pixel groups, each having a size of 3×3, as follows.

First pixel group=$\{P_{0,0}, P_{0,1}, P_{0,2}, P_{1,0}, P_{1,1}, P_{1,2}, P_{2,0}, P_{2,1}, P_{2,2}\}$ Second pixel group=$\{P_{0,3}, P_{0,4}, P_{0,5}, P_{1,3}, P_{1,4}, P_{1,5}, P_{2,3}, P_{2,4}, P_{2,5}\}$ Third pixel group=$\{P_{3,0}, P_{3,1}, P_{3,2}, P_{4,0}, P_{4,1}, P_{4,2}, P_{5,0}, P_{5,1}, P_{5,2}\}$ Four pixel group=$\{P_{3,3}, P_{3,4}, P_{3,5}, P_{4,3}, P_{4,4}, P_{4,5}, P_{5,3}, P_{5,4}, P_{5,5}\}$ For example, the reference pixel setting section 152 may select a pixel $P_{1,1}$ from the first pixel group, a pixel $P_{1,4}$ from the second pixel group, a pixel $P_{4,1}$ from the third pixel group, and a pixel $P_{4,4}$ from the fourth pixel group as reference pixels, respectively. The reference pixel setting section 152 may output reference pixel signals.

The signal processing unit 150 may further include a first computing section 153. The first computing section 153 may receive the reference pixel signals and compute a first power, a first mean frequency and a distribution of the reference pixel signals by using auto correlation at step S108. Also, the signal processing unit 150 may compute a first standard deviation by using the computed distribution at S108.

The signal processing unit 150 may further include a cutoff frequency setting section 154. The cutoff frequency setting section 154 may compute a first cutoff frequency of each of the filters corresponding to the pixels within the ROI 220 by using the first mean frequency at S110. For example, the cutoff frequency setting section 155 may multiply or add a preset weight to the mean frequency to compute the first cutoff frequency of each of the filters.

The signal processing unit 150 may further include a filtering section 155. The filtering section 155 may set filters for removing the clutter signals from each of the pixels within the ROI 220 at step S112. In one embodiment, the filtering section 155 may include clutter filters. The filtering section 155 may set a cutoff frequency of each of the filters by using the first cutoff frequency at step S114. When the first cutoff frequency is a cutoff frequency corresponding to the reference pixel of each of the groups, the filtering section 155 may set an identical cutoff frequency to each of the filters corresponding to each of the pixels in the pixel groups. The filtering section 155 may filter the clutter signals from the second receive signals to thereby extract the Doppler signals at step S116.

The signal processing unit 150 may further include a second computing section 156. The second computing section 156 may be configured to receive the signals with the clutter signals filtered ("filtering signals") and compute a second power and a second mean frequency of the filtering signals at S118.

The signal processing unit 150 may further include a cutoff frequency setting section 154. The cutoff frequency setting section 154 may check whether the first cutoff frequency is suitable by using the first power, the first mean frequency, the first standard deviation, the second power and the second mean frequency, i.e., whether the first cutoff frequency is suitable as a cutoff frequency of the filter of the filtering section 155 at S120. In one embodiment, the cutoff frequency setting section 154 may check whether the first cutoff frequency is suitable by applying the following equations.

$$2^{nd} \text{ mean frequency} \geq 1^{st} \text{ mean frequency} + 1^{st} \text{ standard deviation} + 1^{st} \text{ threshold} \quad (1)$$

$$2^{nd} \text{ power} \leq 1^{st} \text{ power} \times 2^{nd} \text{ threshold} \quad (2)$$

In equations (1) and (2), the first and second thresholds may be predetermined values by a user or in the ultrasound system. The first and second thresholds may be set to 0.3.

When the second mean frequency and the second power meet equations (1) and (2), the cutoff frequency setting section 154 may determine that the first cutoff frequency is suitable and finish the cutoff frequency setting. On the other hand, if the second mean frequency and the second power do not meet at least one of the equations (1) and (2), i.e., if it is determined that the first cutoff frequency is not suitable, then the cutoff frequency setting section 154 may compute a second cutoff frequency and set the second cutoff frequency as the first cutoff frequency at step S122. The steps S114 to S122 may be repeatedly carried out until equations (1) and (2) are satisfied.

Referring back to FIG. 1, the ultrasound system may further include an image processing unit 160 and may form a 2-dimensional image and a Doppler mode image based on the first and second receive signals outputted from the signal processing unit 150, respectively. The ultrasound system may further include a display unit 170 for displaying the 2-dimensional image and the Doppler mode image.

Although it is described above that the cutoff frequency setting section 154 computes the first cutoff frequency by using the first means frequency and the filtering section 155 sets the cutoff frequency of each of the filters by using the first cutoff frequency, the computation of the first cutoff frequency and the setting of the cutoff frequency are not limited thereto. In another embodiment, the cutoff frequency setting section 154 may extract cutoff frequency information corresponding to the first mean frequency from the storage unit 140, while the filtering section 155 may set the cutoff frequency of each of the filters based on the extracted cutoff frequency information.

As described above, since the cutoff frequency of the clutter filter is automatically set based on the power and mean frequency of the clutter signals, the velocity of the blood flow may be accurately detected and the quality of the Doppler mode image may be enhanced.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An ultrasound system, comprising:
a Tx/Rx unit configured to transmit ultrasound signals to a target object and receive echoes reflected from the target object;
a signal processing unit configured to process the received echoes to provide 2-dimensional image data of the target object, the 2-dimensional image data being representative of a 2-dimensional image; and
an input unit configured to enable a user to set a region of interest (ROI) on the 2-dimensional image of the target object, wherein:
the Tx/Rx unit and the signal processing unit are configured to operate such that a Doppler mode image pixel data corresponding to the ROI is obtained, and the signal processing unit is further configured to select a reference pixel from pixels within the ROI, compute a mean frequency of reference pixel signals corresponding to the reference pixel based on the Doppler mode image pixel data, set filter cutoff frequencies of a filter based on the computed mean frequency and filter the Doppler mode image pixel data with the set filter cutoff frequencies to output filtered pixel data with clutter signals filtered.

2. The ultrasound system of claim 1, further comprising:
a storage unit configured to store the Doppler mode image pixel data; and
an image processing unit configured to form the Doppler mode image based on the Doppler mode image pixel data with clutter signals filtered.

3. The ultrasound system of claim 1, wherein the filter includes a clutter filter.

4. The ultrasound system of claim 1, wherein the signal processing unit includes:
a reference pixel setting section configured to select a reference pixel from pixels within the ROI and output reference pixel signals corresponding to the reference pixel from the Doppler mode image pixel data;
a first computing unit section configured to perform auto correlation upon the reference pixel signals to compute a first power, a first mean frequency, a distribution and a standard deviation;
a cutoff frequency setting section configured to compute a first cutoff frequency using the first mean frequency;
a filtering section configured to set the filter cutoff frequencies based on the first cutoff frequency and perform clutter filtering upon the Doppler mode image pixel data by using the filter to output filtered signals; and
a second computing section configured to perform auto correlation upon the filtered signals to compute a second power and a second mean frequency,
wherein the cutoff frequency setting section is configured to determine suitability of the first cutoff frequency by using the first power, the first mean frequency, the first standard deviation, the second power and the second mean frequency.

5. The ultrasound system of claim 4, wherein the reference pixel setting section is configured to select each of the pixels within the ROI as the reference pixel.

6. The ultrasound system of claim 4, wherein the reference pixel setting section is configured to divide the pixels into a plurality of pixel groups, each group including a plurality of neighboring pixels to have a predetermined size, and select the reference pixel from each of the groups.

7. The ultrasound system of claim 4, wherein, if the first cutoff frequency is not suitable, the cutoff frequency setting section is configured to compute a second cutoff frequency for the filter cutoff frequencies by using the first cutoff frequency.

8. The ultrasound system of claim 7, wherein the cutoff frequency setting unit determines whether the first cutoff frequency is suitable by using the following equations:

$$2^{nd} \text{ mean frequency} \geq 1^{st} \text{ mean frequency} + 1^{st} \text{ standard deviation} + 1^{st} \text{ threshold}$$

$$2^{nd} \text{ power} \leq 1^{st} \text{ power} \times 2^{nd} \text{ threshold}$$

wherein the first threshold and the second threshold are predetermined values.

9. A method of setting filters in an ultrasound system, the ultrasound system including a Tx/Rx unit, a signal processing unit and an input unit, comprising:

a) using the Tx/Rx unit within the ultrasound system to transmit ultrasound signals to a target object and receive echoes reflected from the target object;
b) using the signal processing unit within the ultrasound system to process the received echoes to provide 2-dimensional image data of the target object, the 2-dimensional image data being representative of a 2-dimensional image;
c) using an input unit within the ultrasound system to enable a user to set a region of interest (ROI) on the 2-dimensional image of the target object;
d) using the Tx/Rx unit and the signal processing unit within the ultrasound system to operate such that a Doppler mode image pixel data corresponding to the ROI is obtained; and
e) using the signal processing unit within the ultrasound system to select a reference pixel from pixels within the ROI, compute a mean frequency of reference pixel signals corresponding to the reference pixel based on the Doppler mode image pixel data, set filter cutoff frequencies of a filter based on the computed mean frequency and filter the Doppler mode image pixel data with the set filter cutoff frequencies to output filtered pixel data with clutter signals filtered.

10. The method of claim 9, wherein the filter includes a clutter filter.

11. The method of claim 9, wherein at the step e), the signal processing unit is used to:
e1) select a reference pixel from pixels within the ROI and output reference pixel signals corresponding to the reference pixel from the Doppler mode image pixel data;
e2) perform auto correlation upon the reference pixel signals to compute a first power, a first mean frequency, a distribution and a standard deviation;
e3) compute a first cutoff frequency using the first mean frequency;
e4) set the filter cutoff frequencies based on the first cutoff frequency and perform clutter filtering upon the Doppler mode image pixel data to output filtered signals;
e5) perform auto correlation upon the filtered signals to compute a second power and a second mean frequency; and
e6) determine suitability of the first cutoff frequency by using the first power, the first mean frequency, the first standard deviation, the second power and the second mean frequency.

12. The method of claim 11, wherein the signal processing unit selects each of the pixels within the ROI as the reference pixel.

13. The method of claim 11, wherein the signal processing unit is used to divide the pixels into a plurality of pixel groups, each group including a plurality of neighboring pixels to have a predetermined size, and select the reference pixel from each of the groups.

14. The method of claim 11, wherein the signal processing unit is configured to:
determine whether the first cutoff frequency is suitable; and
if the first cutoff frequency is not suitable, compute a second cutoff frequency for the cutoff frequencies of the filters by using the first cutoff frequency; and set the second cutoff frequency as the first cutoff frequency.

15. The method of claim 14, wherein, the determination of whether the first cutoff frequency is suitable is carried out by using the following equations:

$$2^{nd} \text{ mean frequency} \geqq 1^{st} \text{ mean frequency} + 1^{st} \text{ standard deviation} + 1^{st} \text{ threshold}$$

$$2^{nd} \text{ power} \leqq 1^{st} \text{ power} \times 2^{nd} \text{ threshold}$$

where the first threshold and the second threshold are predetermined values.

* * * * *